United States Patent
Stephens et al.

(10) Patent No.: US 8,486,582 B1
(45) Date of Patent: Jul. 16, 2013

(54) SURFACE MODIFICATION TO PREVENT OXIDE SCALE SPALLATION

(71) Applicant: Battelle Memorial Institute, Richland, WA (US)

(72) Inventors: Elizabeth V. Stephens, Kennewick, WA (US); Xin Sun, Richland, WA (US); Wenning Liu, S. Pasadena, CA (US); Jeffry W. Stevenson, Richland, WA (US); Wayne Surdoval, Pittsburgh, PA (US); Mohammad A. Khaleel, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/625,134

(22) Filed: Sep. 24, 2012

(51) Int. Cl.
*H01M 4/64* (2006.01)

(52) U.S. Cl.
USPC .......................................... 429/522; 429/521

(58) Field of Classification Search
None
See application file for complete search history.

(56) References Cited

U.S. PATENT DOCUMENTS

| | | | |
|---|---|---|---|
| 6,676,890 B2* | 1/2004 | Chaleat et al. | 266/236 |
| 6,841,755 B2* | 1/2005 | Dykes et al. | 219/121.6 |
| 6,843,957 B2* | 1/2005 | Statnikov | 266/80 |
| 6,875,953 B2* | 4/2005 | Clauer et al. | 219/121.85 |
| 7,144,768 B2* | 12/2006 | Chung | 438/239 |
| 2011/0203791 A1* | 8/2011 | Jin et al. | 166/244.1 |

OTHER PUBLICATIONS

Cooper et al., The effect of surface treatment on the oxidation of ferritic stainless steels used for solid oxide fuel cell interconnect, Journal of Power Sources, 184 (2008) 220-228, Available online Jun. 14, 2008.*

Liu et al., Life prediction of coated and uncoated metallic interconnect for solid oxide fuel cell applications, Journal of Power Sources, 189 (2009) 1044-1050, Available online Jan. 17, 2009.*

Hutchinson, J. W., Mixed Mode Cracking in Layered Materials, Advances in Applied Mechanics, vol. 29, 1991, 63-191.

Mougin, J., et al., In-situ determination of growth and thermal stresses in chromia scales formed on a ferritic stainless steel*, Materials and Corrosion, 53, 2002, 486-490.

Liu, W. N., et al., Effect of substrate thickness on oxide scale spallation for solid oxide fuel cells, Corrosion Science, 53, 2011, 2406-2412.

Yang, Z., et al., Ce-Modified ?(?Mn?,?Co?)?cO4 Spinel Coatings on Ferritic Stainless Steels for SOFC Interconnect Applications, Electrochemical and Solid State Letters, 11, 2008, B140-B143.

* cited by examiner

*Primary Examiner* — Patrick Ryan
*Assistant Examiner* — Jose Colucci Rios
(74) *Attorney, Agent, or Firm* — A. J. Gokcek

(57) ABSTRACT

A surface modification to prevent oxide scale spallation is disclosed. The surface modification includes a ferritic stainless steel substrate having a modified surface. A cross-section of the modified surface exhibits a periodic morphology. The periodic morphology does not exceed a critical buckling length, which is equivalent to the length of a wave attribute observed in the cross section periodic morphology. The modified surface can be created using at least one of the following processes: shot peening, surface blasting and surface grinding. A coating can be applied to the modified surface.

21 Claims, 5 Drawing Sheets

2000h @ 850°C

4000h @ 850°C

6000h @ 850°C

SURFACE MODIFICATION TO PREVENT OXIDE SCALE SPALLATION

STATEMENT REGARDING FEDERALLY SPONSORED RESEARCH OR DEVELOPMENT

The invention was made with Government support under Contract DE-AC05-76RL01830, awarded by the U.S. Department of Energy. The Government has certain rights in the invention.

TECHNICAL FIELD

This invention relates to surface morphology. More specifically, this invention relates to a modified surface of a ferritic stainless steel structure exhibiting a periodic morphology on the cross-section of the surface.

BACKGROUND OF THE INVENTION

Under typical solid oxide fuel cell (SOFC) operating conditions, an oxide scale layer inevitably forms on the surface of ferritic stainless steels. If the resulting scale/metal interface is structurally weak, spallation, peeling, or delamination can occur along the scale/metal interface. This can lead to degradation of interconnect performance and reduction of useful stack life.

To improve scale adhesion between the oxide scale and the steel alloy, various coating applications have been developed and employed. These coating applications include treating the alloys with oxygen active elements or adding a rare earth element to certain coatings. Although these techniques have been proven to improve scale adhesion, they eventually result in oxide scale growth and serious cell performance degradation. Therefore, a new approach is needed to prevent delamination/spallation of the oxide scale on the surface of ferritic stainless steels.

SUMMARY OF THE INVENTION

The present invention is directed to a surface modification to prevent oxide scale spallation. In one embodiment, the surface comprises a ferritic stainless steel substrate having a modified surface. A cross-section of the modified surface exhibits a periodic morphology.

In one embodiment, the periodic morphology does not exceed a critical buckling length. The critical buckling length is equivalent to the length of a wave attribute observed in the cross section periodic morphology.

In one embodiment, the modified surface has been subject to shot peening. In another embodiment, the modified surface has been subject to surface blasting. In another embodiment, the modified surface has been subject to surface grinding.

In one embodiment, the modified surface further comprises a coating. The coating can comprise, but is not limited to, a rare-earth element containing oxide. The oxide can be, but is not limited to, a Mn—Co spinel oxide.

Preferably, the periodic morphology is applied to the steel prior to application of the coating, as the coating tends to compensate for or smooth out some of the texture of the underlying steel. The steel can be, but is not limited to, a solid oxide fuel cell (SOFC) interconnect.

In one embodiment, the cross-section of the modified surface comprises a real or true surface area greater than its original or apparent surface area.

In another embodiment of the present invention, a method of surface modification to prevent scale spallation is disclosed. The method comprises providing a ferritic stainless steel substrate having a surface. The method also comprises forming a periodic morphology on the cross-section of the surface of the substrate.

In one embodiment, the method comprises subjecting the surface to shot peening, surface blasting, and/or surface grinding.

In another embodiment of the present invention, a surface modification to prevent oxide scale spallation is disclosed. The surface modification includes a ferritic stainless steel substrate having a modified surface. A cross section of the modified surface exhibits a periodic morphology. The periodic morphology does not exceed a critical buckling length. The critical buckling length is equivalent to the length of a wave attribute observed in the cross section periodic morphology.

DETAILED DESCRIPTION OF THE PREFERRED EMBODIMENTS

The present invention is directed to a periodic, surface morphology on a ferritic stainless steel substrate, which can be used as part of an interconnect of a SOFC stack, to prevent oxide scale spallation.

Figure 1:
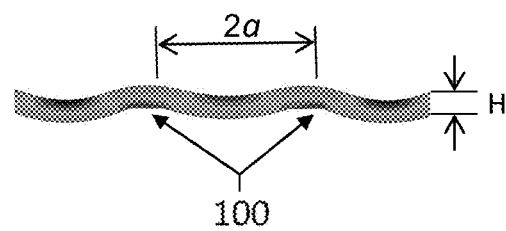
FIG. 1 illustrates a periodic surface morphology. High, compressive stress regions are indicated on the interface of the oxide scale/substrate.

Hutchinson and Suo (Hutchinson, J. W. and Z. Suo. "Mixed mode cracking in layered materials." *Advances in Applied Mechanics* 29 (1991):63-191.) describe the critical buckling stress for a circular disk crack under compression as the following:

$$\sigma_{cr} = 1.2235 \frac{E}{1-v^2} \left(\frac{H}{a}\right)^2 \quad (1)$$

where the critical buckling stress, $\sigma_{cr}$, is inversely proportional to $a^2$ for a given oxide thickness, H, in which a is the radius of the free standing crack along the oxide/substrate interface, E is the oxide scale elastic modulus, and v is the oxide scale Poisson's ratio. From this relationship, we deduced that creating a global, periodic surface morphology, as illustrated in FIG. 1, may play an effective role in reducing the length of a, thus increasing the critical stress level required for the oxide scale to buckle. In FIG. 1, high, compressive stress regions 100 are observed on the interface of the oxide scale/substrate.

The value of the free standing crack radius, a, is system dependent for it depends on the mechanical properties of the oxide scale and the thickness of the oxide scale for a given substrate. For spallation not to occur, the spallation resistance must be greater than the buckling driving force ($\sigma_{cr}$), i.e., cooling induced compressive stress in the scale. Hence, we define the following relation for a from Equation 1:

$$a < \sqrt{\frac{1.2235}{\sigma_{cr}} \cdot \frac{E}{1-v^2} \cdot H} \quad (2)$$

And once a is determined, 2a (the critical buckling length) may then be determined. The oxide thickness, H, can be extrapolated from oxide growth kinetic curves and the physical properties of the oxide scale (i.e. $\sigma_{cr}$, E, v) may be measured through varying experimental techniques.

Applying this relationship to our embodiment of Ce-spinel coated 441SS substrates where a chromia scale, $Cr_2O_3$, forms on the substrate surface, we can determine a for an oxide thickness at 40,000 hours of IC life (the IC material life requirement) and then determine 2a, the critical length that should not be exceeded. This critical buckling length is equivalent to the length of the wave attribute observed in the cross-section periodic morphology.

We have determined that a should not exceed 94 µm, therefore, the critical buckling length (2a) should not exceed 188 µm for our Ce-spinel coated SS441 embodiment to meet the designed life of 40,000 h.

Surface modification of a metallic substrate with a periodic surface morphology may be achieved by various processing techniques. These techniques include, but are not limited to, shot peening, surface blasting and surface grinding.

Figure 2A:
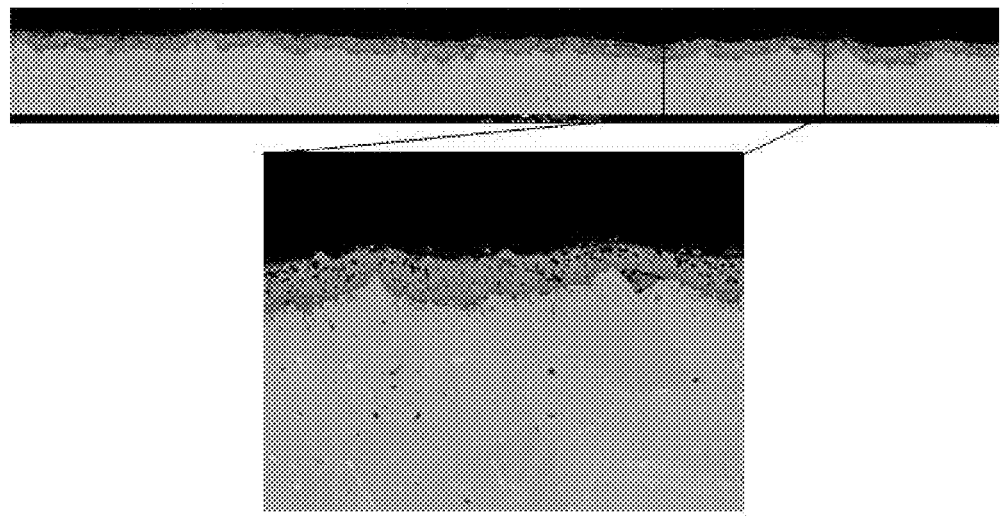
FIG. 2A shows cross-section images of the periodic surface morphology applied to a stainless-steel substrate, created through shot-peening.
Figure 2B:
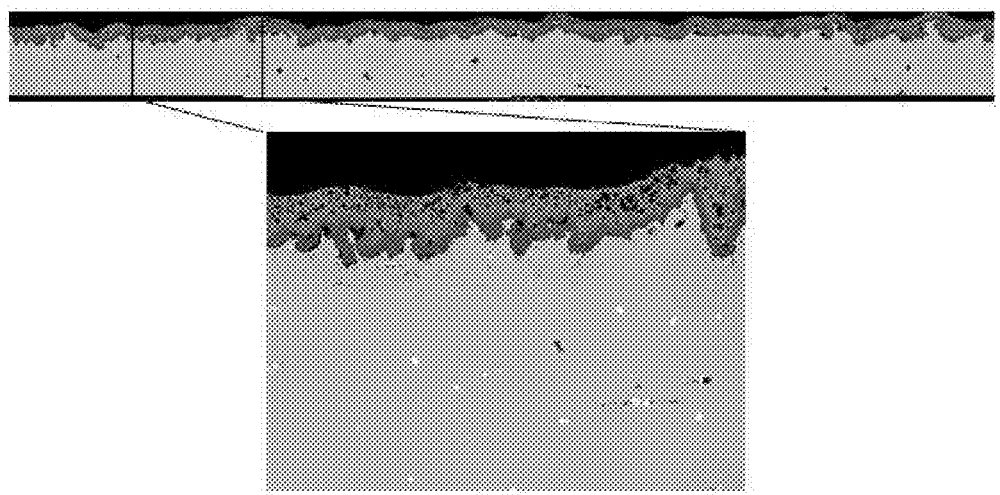
FIG. 2B shows cross-section images of the periodic surface morphology applied to a stainless-steel substrate, created through shot-blasting.

FIGS. 2A and 2B are cross-section images of the periodic surface morphology applied to 441 stainless-steel substrates prior to coating, in accordance with one embodiment of the Present Invention. Magnified images of a section of the profile are also included. A "waviness" attribute of the periodic morphology on the surface of the substrate is observed with FIG. 2A illustrating a more regular, periodic surface morphology and FIG. 2B illustrating a less regular, periodic surface morphology.

In FIG. 2A, the periodic surface morphology was created through shot-peening. In FIG. 2B, the periodic surface morphology was created through surface blasting.

Figure 3:
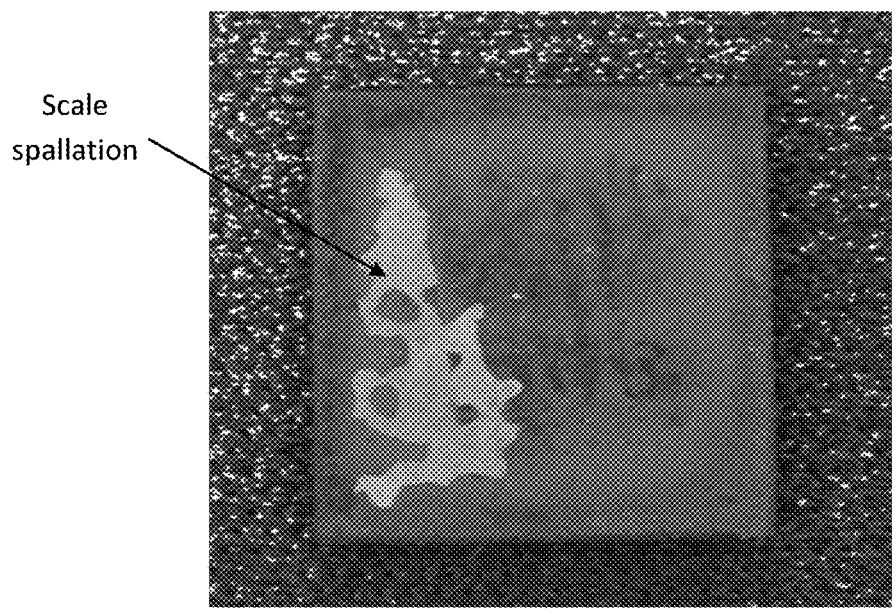
FIG. 3 shows an image of a coated 441 SS substrate exposed to 850° C. for 2000 hours without surface modification.

An extension of IC life is observed when the surface of 441 SS substrates is modified with a periodic surface morphology before coating. When coated 441SS substrates are exposed to either 800° C. or 850° C. for an extended length of time (i.e. 2000 h) without the periodic surface morphology, the oxide scale spalls when the specimen is cooled to room temperature as shown in FIG. 3. However, when the surface of 441SS substrates are modified with a periodic surface morphology before coating, then exposed to the same elevated temperatures for the same duration or longer, no spallation is observed upon cooling (FIG. 4A).

The "no spallation" result has been observed in many coated 441 SS specimens where the surface of each specimen was modified with the periodic morphology of the Present Invention and then exposed to SOFC operating temperatures. No spallation was observed in surface modified specimens that were exposed to 800° C. up to ten 2000 hour thermal cycles—total of 20,000 hours exposed at temperature—and also in surface modified specimens that were exposed to 850° C. up to six 2000 hour thermal cycles (total of 12,000 hours exposed at temperature). At the end of each 2000 hour thermal cycle, specimens were cooled to room temperature.

Figure 4A:
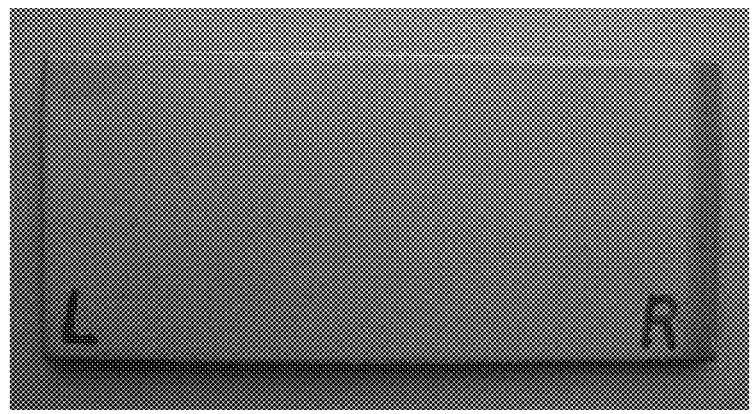
FIG. 4A shows an image of a coated 441 SS substrate that was surface modified, in accordance with one embodiment of the present invention, and then exposed to 850° C. for 2000 hours or one thermal cycle.
Figure 4B:
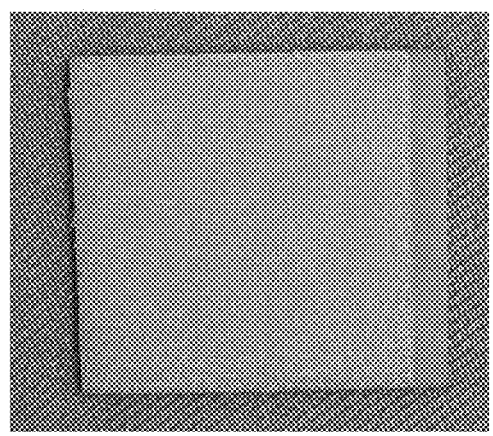
FIG. 4B shows an image of a coated 441 SS substrate that was surface modified, in accordance with one embodiment of the present invention, and then exposed to 850° C. for 4000 hours or two thermal cycles.
Figure 4C:
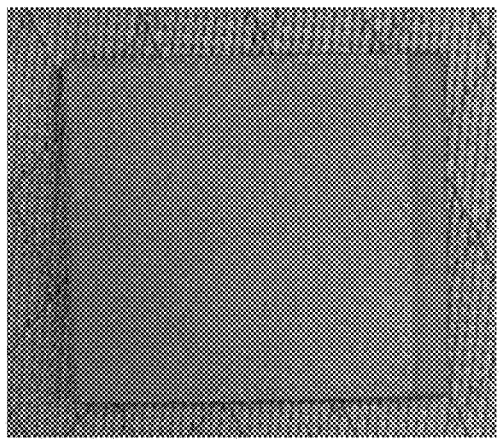
FIG. 4C shows an image of a coated 441 SS substrate that was surface modified, in accordance with one embodiment of the present invention, and then exposed to 850° C. for 6000 hours or three thermal cycles.

FIGS. 4A-4C show images of surface modified 441 SS coated specimens at the end of each thermal cycle where the specimen was exposed at 850° C. and no spallation was observed. In FIG. 4A, the substrate was surface modified and then exposed to 850° C. for 2000 hours (or one thermal cycle). In FIG. 4B, the substrate was surface modified and then exposed to 850° C. for 4000 hours (or two thermal cycles). In FIG. 4C, the substrate was surface modified and then exposed to 850° C. for 6000 hours (or three thermal cycles). From these results, it is evident that the surface modification of the Present Invention is delaying or mitigating oxide scale spallation.

As mentioned, an optional coating can be applied to the stainless steel substrate after modification of the surface. The coating can include a rare-earth element, such as cerium, as part of the oxide coating material. In one embodiment, the oxide is a Mn—Co spinel oxide.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A surface modification to prevent oxide scale spallation comprising: a ferritic stainless steel substrate having a modified surface, wherein a cross-section of the modified surface exhibits a periodic morphology that does not exceed a critical buckling length; and thereby an oxide scale layer on the surface is prevented from spalling.

2. The surface modification of claim 1 wherein the critical buckling length is equivalent to the length of a wave attribute observed in the cross-section periodic morphology.

3. The surface modification of claim 1 wherein the modified surface has been subject to shot peening.

4. The surface modification of claim 1 wherein the modified surface has been subject to surface blasting.

5. The surface modification of claim 1 wherein the modified surface has been subject to surface grinding.

6. The surface modification of claim 1 wherein the modified surface further comprises a coating.

7. The surface modification of claim 6 wherein the coating comprises a rare-earth element containing oxide.

8. The surface modification of claim 7 wherein the oxide is a Mn—Co spinel oxide.

9. The surface modification of claim 1 wherein the cross-section of the modified surface comprises a real surface area greater than its original surface area.

10. The surface modification of claim 1 wherein the ferritic stainless steel substrate comprises a solid oxide fuel cell (SOFC) interconnect.

11. A method of surface modification to prevent oxide scale spallation comprising:
   a) providing a ferritic stainless steel substrate having a surface; and b) forming a periodic morphology on the cross-section of the surface, wherein the periodic morphology does not exceed a critical buckling length.

12. The method of claim 11 wherein the critical buckling length is equivalent to the length of a wave attribute observed in the cross-section periodic morphology.

13. The method of claim 11 further comprising subjecting the surface to shot peening.

14. The method of claim 11 further comprising subjecting the surface to surface blasting.

15. The method of claim 11 further comprising subjecting the surface to surface grinding.

16. The method of claim 11 further comprising applying a coating to the surface.

17. The method of claim 16 wherein the coating comprises a rare-earth element containing oxide.

18. The method of claim 17 wherein the oxide is a Mn—Co spinel oxide.

19. The method of claim 11 wherein the cross-section of the periodic surface comprises a real surface area greater than its original surface area.

20. The method of claim 11 wherein the ferritic stainless steel substrate comprises a solid oxide fuel cell (SOFC) interconnect.

21. A surface modification to prevent oxide scale spallation comprising: a ferritic stainless steel substrate having a modified surface, wherein a cross-section of the modified surface exhibits a periodic morphology; and thereby an oxide scale layer on the surface is prevented from spalling, wherein the periodic morphology does not exceed a critical buckling length, and wherein the critical buckling length is equivalent to the length of a wave attribute observed in the cross-section periodic morphology.

* * * * *